(12) United States Patent
Sato

(10) Patent No.: US 7,978,660 B2
(45) Date of Patent: Jul. 12, 2011

(54) BASE STATION, MOBILE TERMINAL, AND COMMUNICATIONS METHOD

(75) Inventor: Naoto Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 108 days.

(21) Appl. No.: 12/232,893

(22) Filed: Sep. 25, 2008

(65) Prior Publication Data

US 2009/0154378 A1  Jun. 18, 2009

(30) Foreign Application Priority Data

Dec. 18, 2007 (JP) ................................ 2007-326457

(51) Int. Cl.
*H04W 4/00* (2009.01)
(52) U.S. Cl. ................... 370/334; 370/310; 370/332
(58) Field of Classification Search .................. 370/276, 370/277, 280, 282, 310, 313, 314, 328, 329, 370/331, 332, 334, 336, 337
See application file for complete search history.

(56) References Cited

U.S. PATENT DOCUMENTS

| | | | |
|---|---|---|---|
| 2002/0120184 A1* | 8/2002 | Beck et al. ................ | 600/300 |
| 2006/0126570 A1 | 6/2006 | Kim | |
| 2006/0153131 A1 | 7/2006 | Kang | |
| 2006/0239239 A1 | 10/2006 | Yang | |
| 2008/0009285 A1* | 1/2008 | Cho et al. ................ | 455/435.1 |
| 2008/0123583 A1* | 5/2008 | Shiizaki et al. ............ | 370/315 |
| 2009/0147872 A1* | 6/2009 | Chong et al. ............. | 375/260 |

FOREIGN PATENT DOCUMENTS

| | | |
|---|---|---|
| JP | 11-289335 | 10/1999 |
| JP | 2006-148388 | 6/2006 |

OTHER PUBLICATIONS

European Search Report based on EP 08170744.0-1525 (Dated Jul. 7, 2009).
IEEE std 802.16e—2005 for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1.

* cited by examiner

*Primary Examiner* — Chi H Pham
*Assistant Examiner* — Weibin Huang
(74) *Attorney, Agent, or Firm* — Fujitsu Patent Center

(57) ABSTRACT

A base station, to which Orthogonal Frequency Division Multiplexing/Orthogonal Frequency Division Multiple Access is applied, communicates with a mobile terminal according to Time Division Duplex, in which a transmission frame includes a downlink subframe and an uplink subframe. The base station includes multiple antennas; a radio communications part configured to transmit the downlink subframe through a first one of the antennas and to receive an initial ranging code transmitted by the mobile terminal through a second one of the antennas during the transmission of the downlink subframe; and a ranging processing part configured to perform ranging based on the initial ranging code received by the radio communications part.

8 Claims, 11 Drawing Sheets

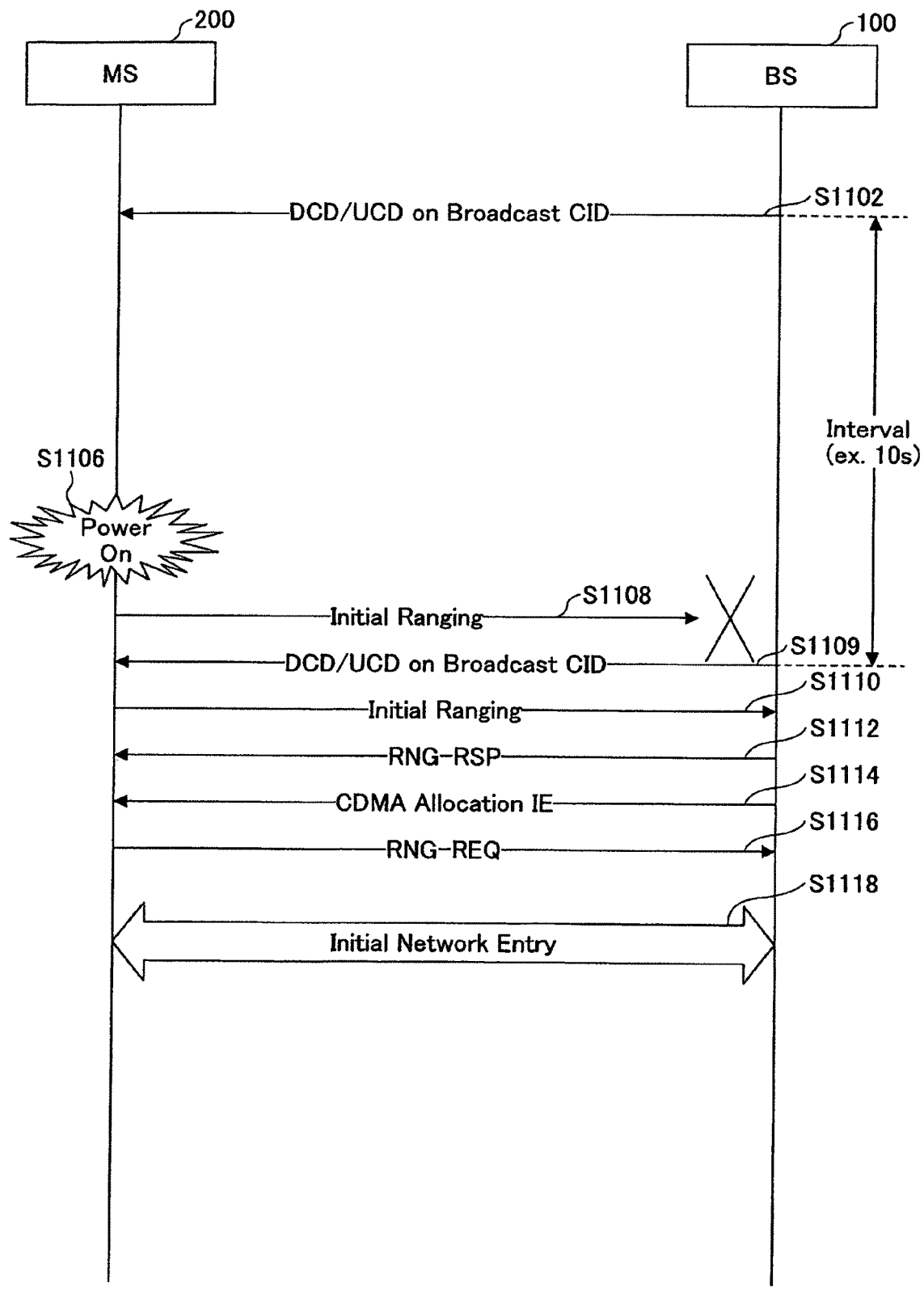

ns of Burst #1. An uplink map (UL-MAP) and DCD/UCD have been transmitted in Burst #1. The mobile terminal 20 can read the UL-MAP and DCD/UCD by reading Burst #1.

BASE STATION, MOBILE TERMINAL, AND COMMUNICATIONS METHOD

BACKGROUND OF THE INVENTION

1. Field of the Invention

The present invention relates generally to broadband radio systems to which Orthogonal Frequency Division Multiplexing (OFDM)/Orthogonal Frequency Division Multiple Access (OFDMA) is applicable, and more particularly to a base station, a mobile terminal, and a communications method capable of widening the band and increasing the efficiency of use of radio resources.

2. Description of the Related Art

In these years, broadband radio communications systems have been required to be broader in band and to increase the efficiency of use of radio resources to be cheaper per bit.

Examples of broadband radio communications systems include Worldwide Interoperability for Microwave Access (WiMAX) to which Orthogonal Frequency Division Multiplexing (OFDM)/Orthogonal Frequency Division Multiple Access (OFDMA) is applied. WiMAX may be referred to as IEEE (Institute of Electrical and Electronic Engineers) 802.16e.

A description is given below of WiMAX as a broadband radio communications system to which OFDM/OFDMA is applied.

A description is given, with reference to FIG. 1, of the initial sequence of an initial network entry in a WiMAX system.

FIG. 1 is a flowchart showing an initial network entry procedure.

Referring to FIG. 1, a base station (BS) 10 puts DCD (Downlink Channel Descriptor)/UCD (Uplink Channel Descriptor) on a broadcast channel at any transmission intervals, and transmits DCD/UCD to each mobile terminal (mobile station: MS) 20 subordinate to the base station 10 (steps S2 and S6). In FIG. 1, the transmission interval is indicated by "Interval," and is, for example, 10 s. Here, DCD is a medium access control (MAC) message that describes the physical layer characteristics of a downlink channel, and UCD is a medium access control (MAC) message that describes the physical layer characteristics of an uplink channel.

FIG. 2 is a diagram showing a transmission frame/reception frame configuration in WiMAX. (See, for example, IEEE 802.16e.) DCD/UCD provides information on the transmission frame/reception frame configuration. For example, DCD/UCD includes information such as TTG (Transmit/Receive Transition Gap)/RTG (Receive/Transmit Transition Gap), the uplink (UL)-downlink (DL) frame assignment ratio, and the modulation method of bursts for transmission/reception assigned to each of the uplink and downlink frames. Here, TTG indicates the gap of switching between transmission and reception, that is, the time interval between the transmission frame and the reception frame, and RTG indicates the gap of switching between reception and transmission, that is, the time interval between the reception frame and the transmission frame.

A description is given of the operation of the mobile terminal 20 being turned ON and entering a network.

Referring back to FIG. 1, in step S4, the mobile terminal 20 is turned ON to synchronize with a radio frame transmitted by the base station 10. For example, the mobile terminal 20 synchronizes with the radio frame by a preamble included in the radio frame. Then, the mobile terminal 20 reads a frame control header (FCH) to recognize a downlink map (DL-MAP). The DL-MAP includes information on the assignment of the downlink channel. Then, the mobile terminal 20 reads the DL-MAP to recognize the position of Burst #1. An uplink map (UL-MAP) and DCD/UCD have been transmitted in Burst #1. The mobile terminal 20 can read the UL-MAP and DCD/UCD by reading Burst #1.

As described above, the mobile terminal 20 understands the configuration of the entire frame by DCD/UCD, and reads the position of a ranging region set on the UL frame defined by the UL-MAP. Then, the mobile terminal 20 starts a network entry procedure (step S10) by transmitting a ranging code to the ranging region (step S8).

However, the above-described conventional technique has problems such as the following.

In radio communications systems to which OFDM/OFDMA is applied, a procedure called ranging should be followed as the network entry procedure of the mobile terminal 20. In order to recognize the ranging region included in the uplink subframe, which ranging region is necessary to proceed with the ranging, the mobile terminal 20 is required to understand the configuration of the entire frame by DCD/UCD and then read the position information of the ranging region defined on the UL-MAP.

However, UCD/DCD is large in data size. Further, the time interval of the broadcasting of DCD/UCD is an important parameter in system design. This time interval needs to be set at an optimum value based on the protocol overhead and the downlink transmission band. Currently, this time interval is considered to be approximately ten seconds.

For example, as shown in FIG. 3, in the case where DCD/UCD is broadcast (steps S2, S3, S6, S12, and S14), the mobile terminal 20 is turned ON (step S4), and the initial network entry is performed (step S11), ranging may be started after passage of the time interval of the broadcasting of DCD/UCD, for example, after ten seconds (step S8).

SUMMARY OF THE INVENTION

According to one embodiment of the present invention, a base station, a mobile terminal, and a communications method are provided that can reduce the time after the turning-ON (power-ON) of a mobile terminal before the start of ranging.

According to one embodiment of the present invention, there is provided a base station to which Orthogonal Frequency Division Multiplexing/Orthogonal Frequency Division Multiple Access is applied, the base station communicating with a mobile terminal according to Time Division Duplex, wherein a transmission frame in Time Division Duplex includes a downlink subframe and an uplink subframe, the base station including a plurality of antennas; a radio communications part configured to transmit the downlink subframe through a first one of the antennas and to receive an initial ranging code transmitted by the mobile terminal through a second one of the antennas during the transmission of the downlink subframe; and a ranging processing part configured to perform ranging based on the initial ranging code received by the radio communications part.

According to one embodiment of the present invention, there is provided a mobile terminal to which Orthogonal Frequency Division Multiplexing/Orthogonal Frequency Division Multiple Access is applied, the mobile terminal communicating with a base station according to Time Division Duplex, wherein a transmission frame in Time Division Duplex includes a downlink subframe and an uplink subframe, the mobile terminal including a plurality of antennas; and a radio communications part configured to receive the downlink subframe through a first one of the antennas and to transmit an initial ranging code through a second one of the antennas during the reception of the downlink subframe.

According to one embodiment of the present invention, there is provided a method of performing communications according to Time Division Duplex, to which method Orthogonal Frequency Division Multiplexing/Orthogonal Frequency Division Multiple Access is applied, wherein a transmission frame in Time Division Duplex includes a downlink subframe and an uplink subframe, the method including (a) a base station transmitting the downlink subframe through a first one of first antennas thereof; (b) a mobile terminal receiving the downlink subframe through a first one of second antennas thereof; (c) the mobile terminal transmitting an initial ranging code through a second one of the second antennas thereof; (d) the base station receiving the initial ranging code transmitted by the mobile terminal through a second one of the first antennas thereof during the transmission of the downlink subframe; and (e) the base station performing ranging based on the initial ranging code received in step (d).

According to one aspect of the present invention, it is possible to reduce the time after the turning-ON (power-ON) of a mobile terminal before the start of ranging.

BRIEF DESCRIPTION OF THE DRAWINGS

Other objects, features and advantages of the present invention will become more apparent from the following detailed description when read in conjunction with the accompanying drawings, in which:

FIG. 11 is a flowchart showing an initial network entry procedure in the communications system according to the second embodiment of the present invention.

DETAILED DESCRIPTION OF THE PREFERRED EMBODIMENTS

Figure 1:
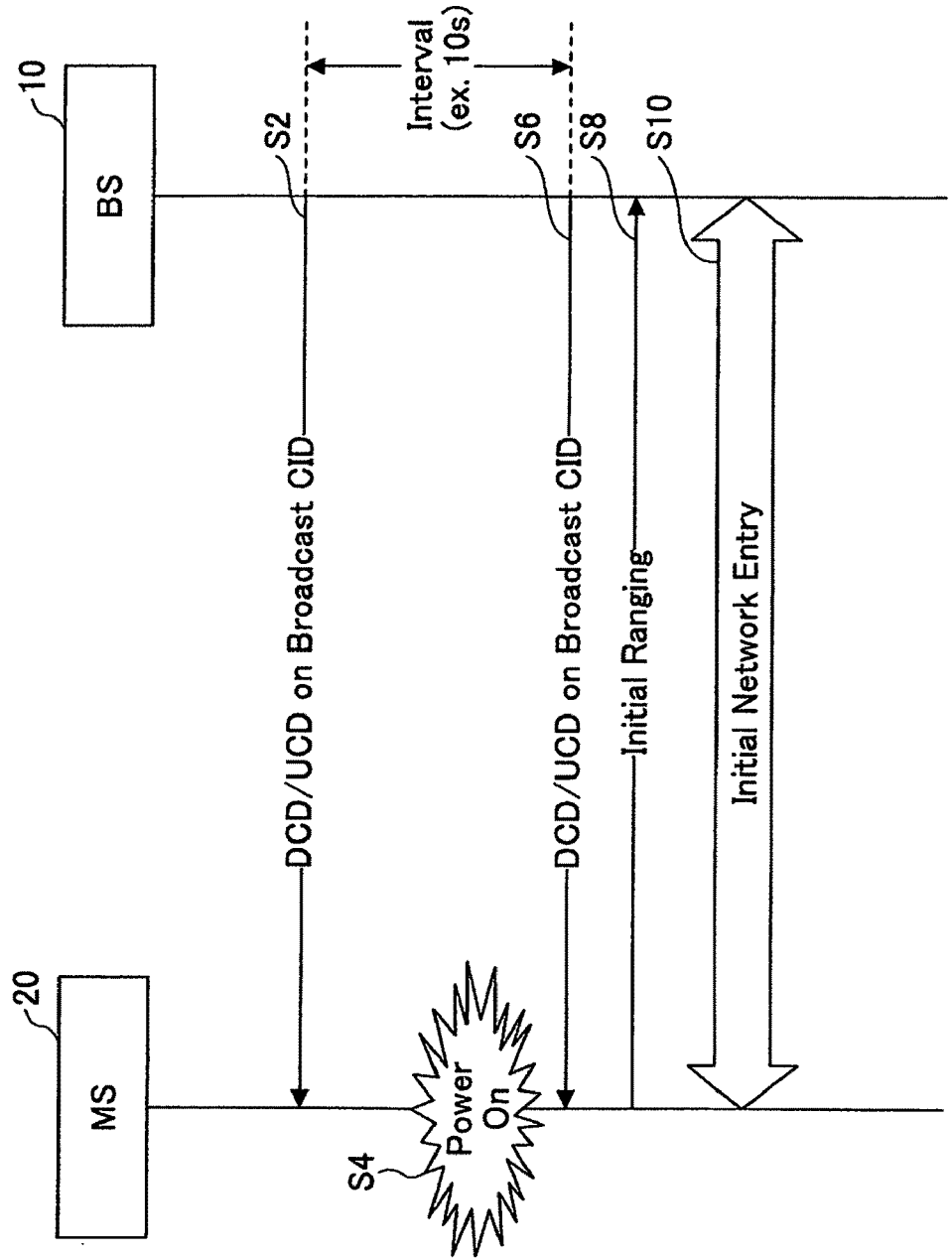
FIG. 1 is a flowchart showing an initial network entry procedure.
Figure 2:
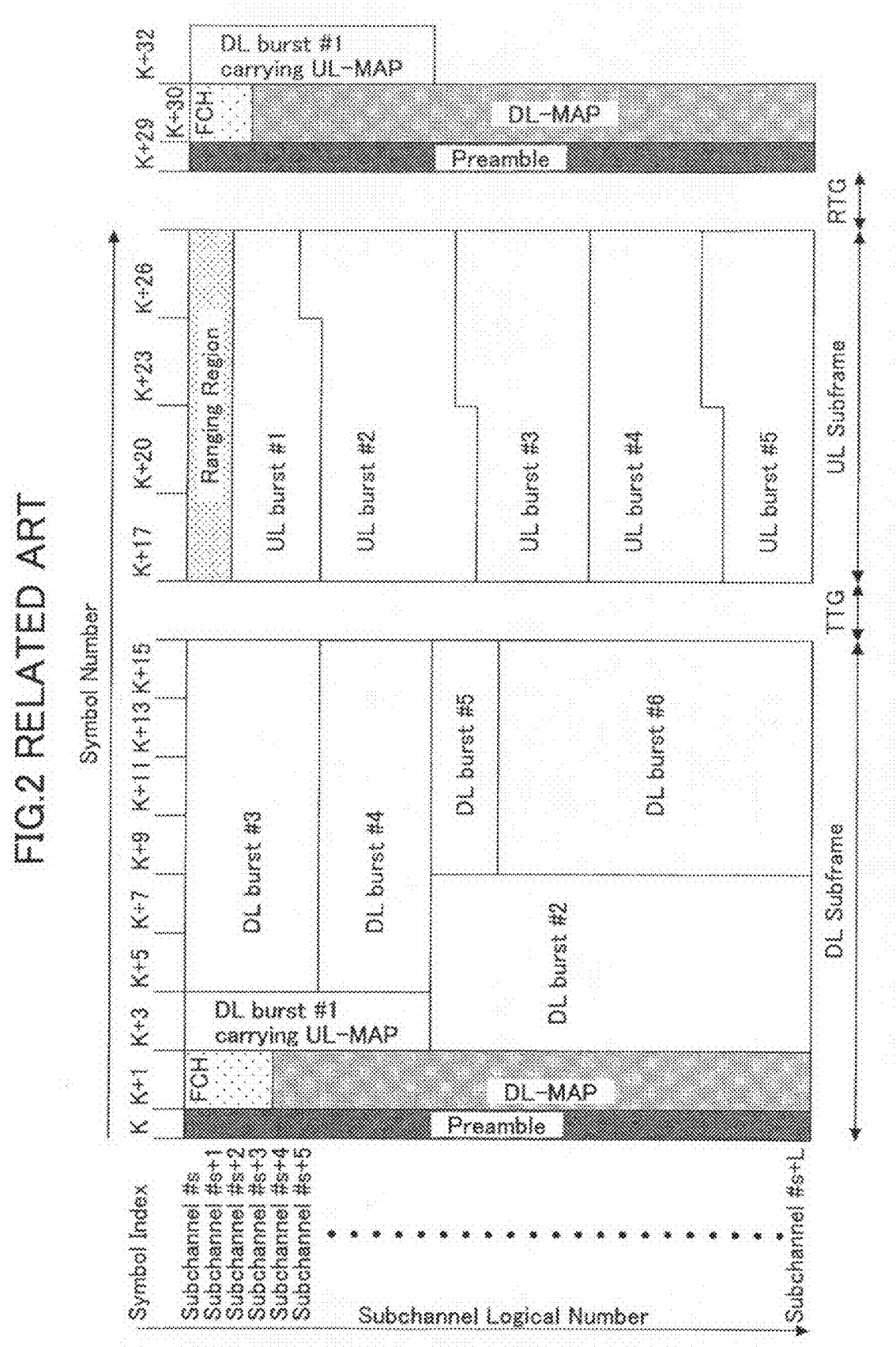
FIG. 2 is a diagram showing a frame format.
Figure 3:
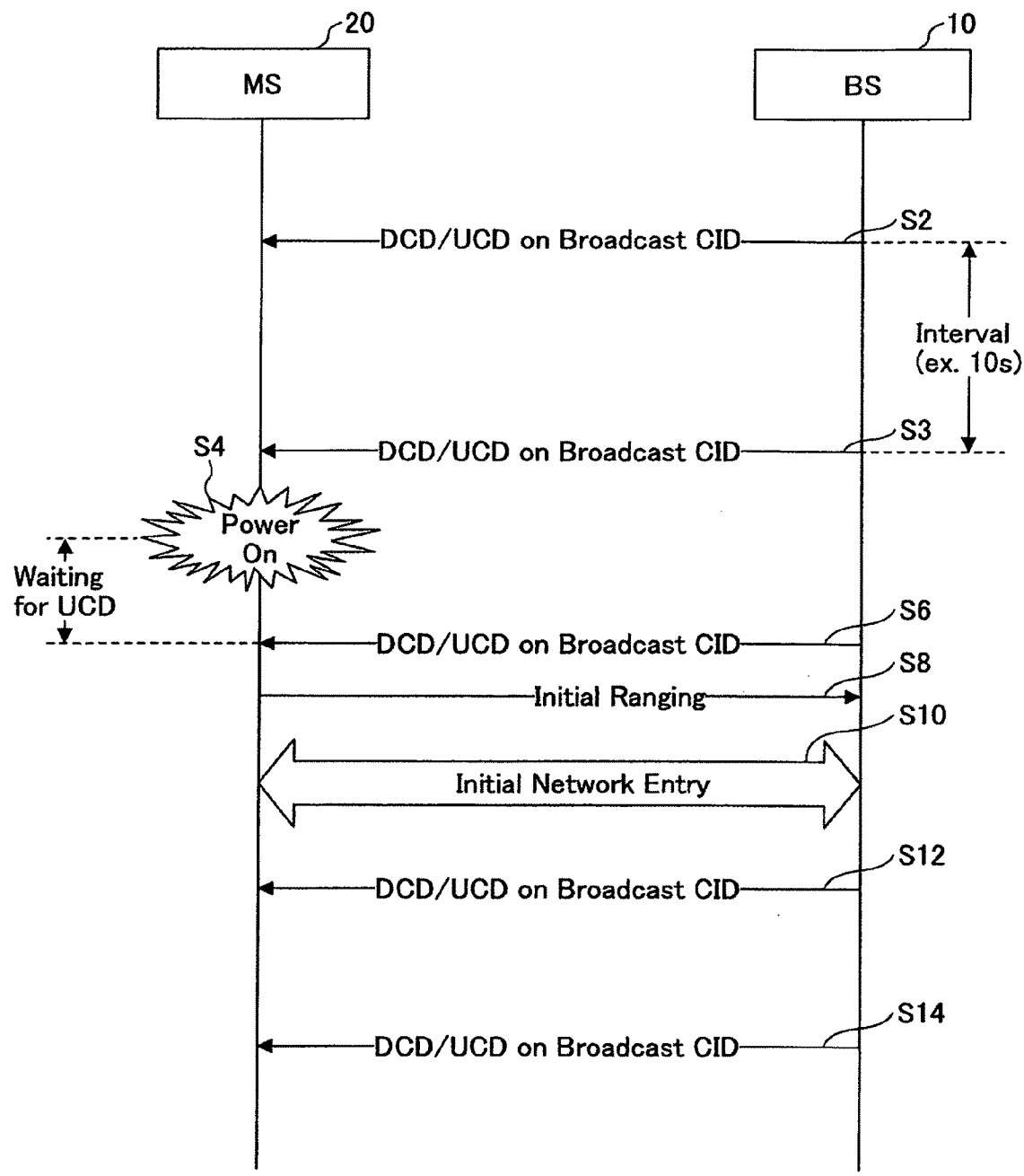
FIG. 3 is a flowchart showing an initial network entry procedure.

A description is given below, with reference to the accompanying drawings, of embodiments of the present invention.

In the drawings for describing the embodiments, the elements having the same function are referred to by the same reference numeral, and a repetitive description thereof is omitted.

First Embodiment

A description is given of a communications system according to a first embodiment of the present invention.

Time Division Duplex (TDD) is applied to the communications system of this embodiment. According to TDD, an uplink signal and a downlink signal are transmitted in the same frequency band, and the uplink and the downlink are switched at high speed, so that full duplex communications are performed. Transmission frames in TDD include a downlink subframe in which a downlink signal is transmitted and an uplink subframe in which an uplink signal is transmitted. Further, OFDM/OFDMA is applied to the communications system according to this embodiment. Examples of communications systems that satisfy these requirements include WiMAX. Accordingly, in this embodiment, a description is given, taking WiMAX as an example. The present invention is applicable to communications systems other than WiMAX as long as they satisfy these requirements.

The communications system according to this embodiment includes a base station (BS) 100 (FIG. 5, FIG. 7, FIG. 8, FIG. 10, and FIG. 11) and a mobile terminal (MS: mobile station) 200 (FIG. 6, FIG. 7, FIG. 8, FIG. 10, and FIG. 11). The base station 100 and the mobile terminal 200 perform communications according to TDD.

Figure 4:
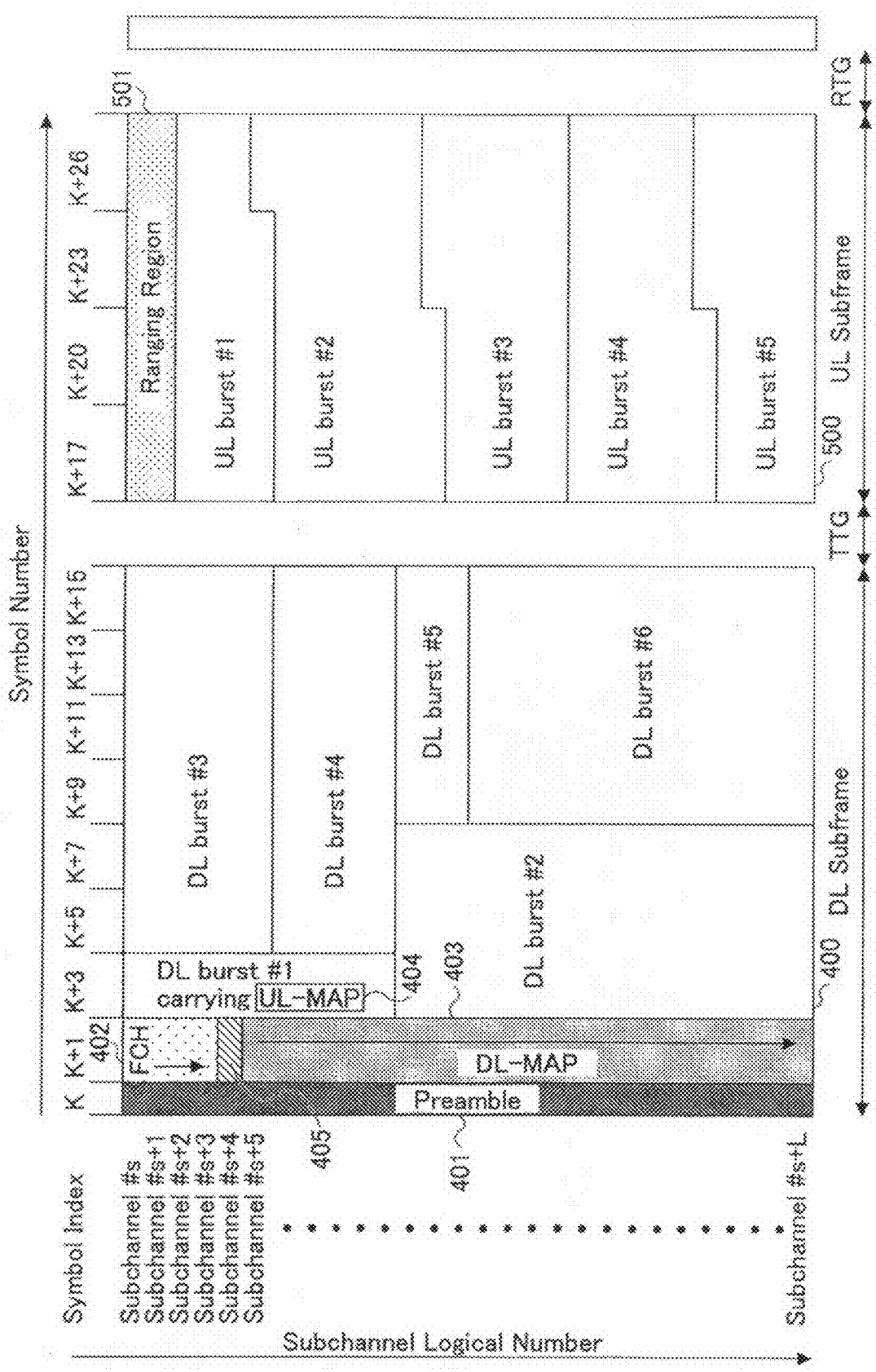
FIG. 4 is an illustrative diagram showing a frame format according to a first embodiment of the present invention.

FIG. 4 is a diagram showing a frame format according to this embodiment. The transmission frame in TDD includes a downlink subframe (DL subframe) 400 and an uplink subframe (UL subframe) 500 as shown in FIG. 4. That is, a pair of downlink and uplink subframes forms a single frame. In FIG. 4, the vertical axis represents the subchannel logical number, and the horizontal axis represents the symbol number. Further, one slot is formed of two symbols in the downlink subframe, and one slot is formed of three symbols in the uplink subframe.

The downlink subchannels include a preamble 401, a frame control header (FCH) 402, a downlink map (DL-MAP) 403, an uplink map (UL-MAP) 404, and a downlink burst (DL burst). The downlink burst may be segmented (divided) into multiple regions. In the case shown in FIG. 4, the downlink burst is segmented (divided) into 6 regions (DL burst #1 through DL burst #6). The uplink subchannels include a ranging region 501 and an uplink burst (UL burst). The uplink burst may be segmented (divided) into multiple regions. In the case shown in FIG. 4, the uplink burst is segmented (divided) into five regions (UL burst #1 through UL burst #5).

Figure 5:
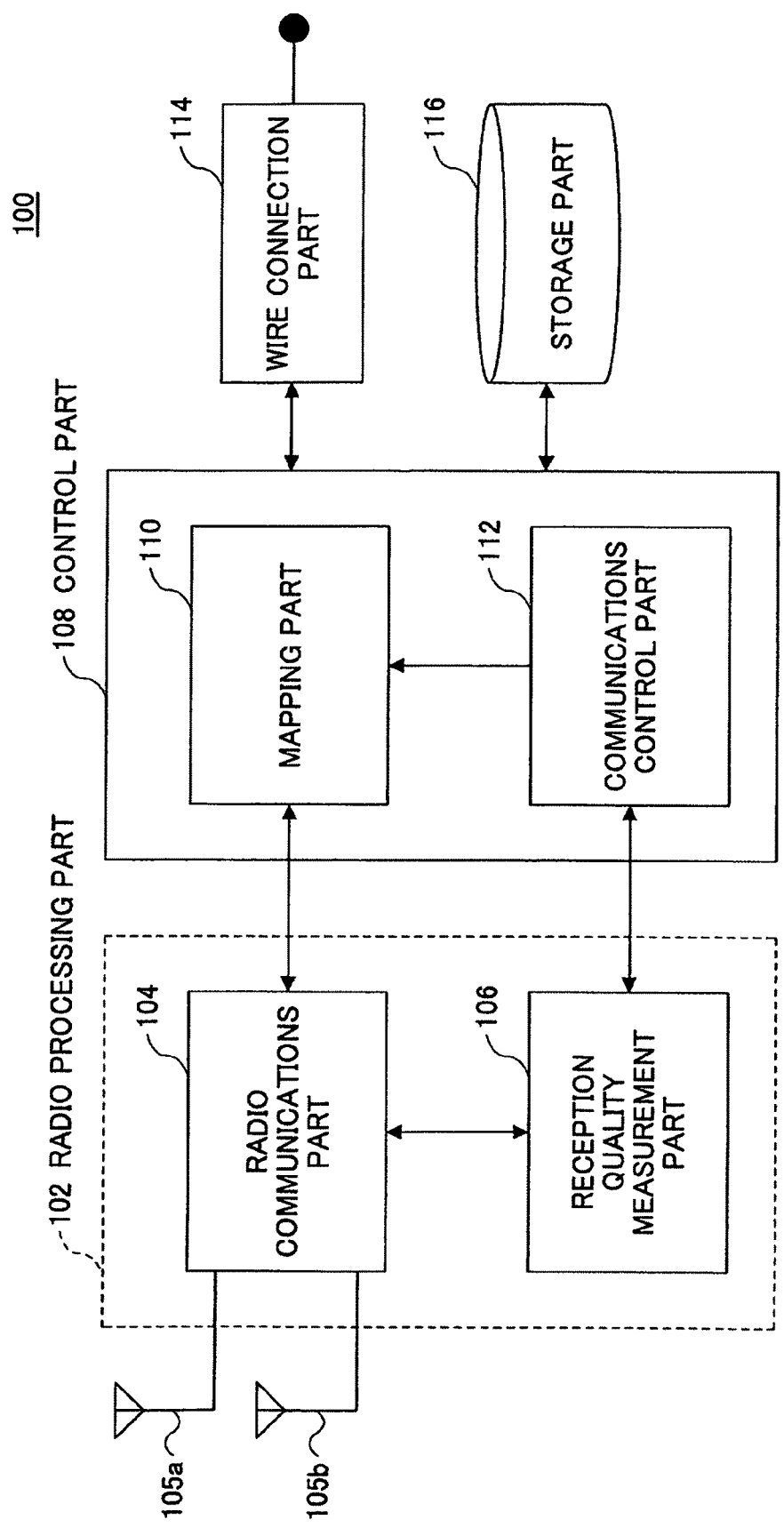
FIG. 5 is a block diagram showing part of a base station according to the first embodiment of the present invention.
Figure 6:
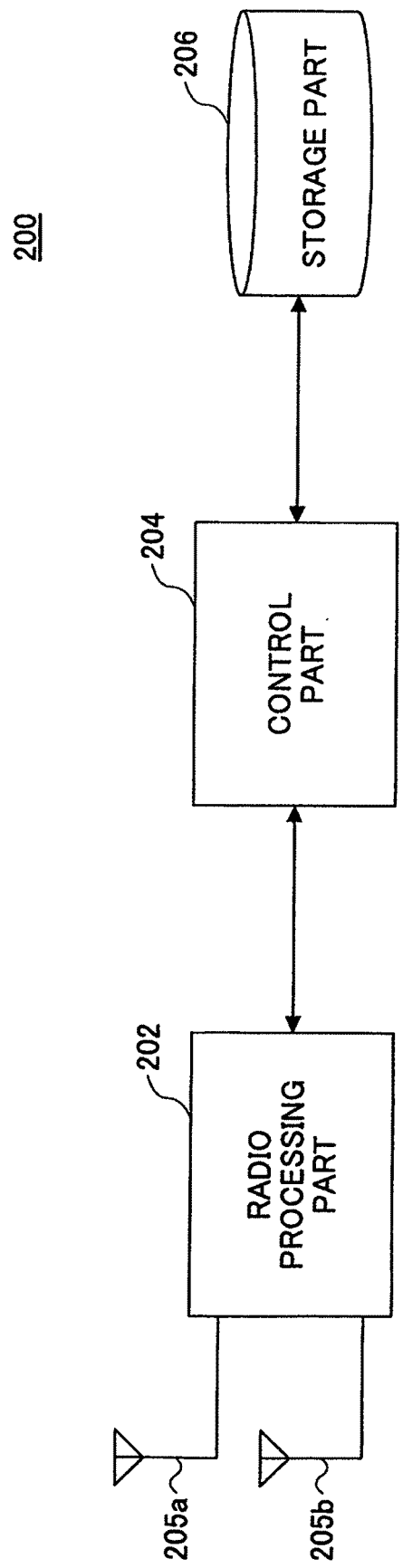
FIG. 6 is a block diagram showing part of a mobile terminal according to the first embodiment of the present invention.

The base station 100 includes multiple antennas, for example, two antennas 105*a* and 105*b* as shown in FIG. 5. The mobile terminal 200 includes multiple antennas, for example, two antennas 205*a* and 205*b* as shown in FIG. 6. The base station 100 and the mobile terminal 200 perform communications based on MIMO (Multiple Input Multiple Output). In this embodiment, a description is given of the case where each of the base station 100 and the mobile terminal 200 has two antennas by way of example. However, the present invention is also applicable to the case where each of the base station 100 and the mobile terminal 200 has three or more antennas. Further, the number of antennas of the base station 100 and the number of antennas of the mobile terminal 200 may be different. Of the information included in the downlink subframe 400, the preamble 401, the frame control header 402, and the DL-MAP 403, which are common to all mobile terminals, do not have to be transmitted with two antennas. The base station 100 transmits such information using a single antenna. That is, MIMO is not used in the MAP region.

The mobile terminal 200 transmits an initial ranging code using a preallocated ranging region (initial ranging region) 405 in the downlink subframe 400. The initial ranging code may also be referred to as "CDMA (Code Division Multiple Access) ranging code." In the communications system according to this embodiment, the initial ranging region 405 is predetermined as a radio resource for transmitting the initial ranging code in the downlink subframe 400. For example, the initial ranging region 405 may be determined in the downlink subframe 400 on the protocol.

The base station 100 receives the initial ranging code transmitted from the mobile terminal 200 using one of the two antennas 105a and 105b, which one is not transmitting the preamble 401, the frame control header 402, and the DL-MAP 403. That is, the base station 100 transmits the preamble 401, the frame control header 402, and the DL-MAP 403 among the information included in the downlink subframe 400 using one of the antennas 105a and 105b, and receives the initial ranging code transmitted from the mobile terminal 200 with the other one of the antennas 105a and 105b.

This configuration enables the mobile terminal 200 that has been turned ON to perform initial ranging without reading DCD/UCD. Accordingly, it is possible to reduce the time after the turning-ON of the mobile terminal 200 before initial entry.

A description is given, with reference to FIG. 5, of the base station 100 according to this embodiment.

FIG. 5 is a block diagram illustrating part of the base station 100.

Referring to FIG. 5 as well as FIG. 4, the base station 100 includes a radio processing part 102. The radio processing part 102 transmits part of a downlink signal in the downlink subframe 400 (FIG. 4) using one of the two antennas 105a and 105b. The part of the downlink signal transmitted using the one of the antennas 105a and 105b includes the preamble 401, the frame control header 402, and the DL-MAP 403. Further, the radio processing part 102 transmits the remaining part of the downlink signal, that is, the part other than the preamble 401, the frame control header 402, and the DL-MAP 403, using the two antennas 105a and 105b. The remaining part of the downlink signal includes the UL-MAP 404 and the downlink burst (DL burst #1 through DL burst #6). The UL-MAP 404 may be included in the downlink burst as shown in FIG. 4, where the UL-MAP 404 is included in DL burst #1.

Further, while transmitting the downlink signal using the one of the antennas 105a and 105b, the radio processing part 102 receives the initial ranging code transmitted from the mobile terminal 200 by the initial ranging procedure using the other one of the antennas 105a and 105b which one is not transmitting the downlink signal. The radio processing part 102 awaits the initial ranging code to be transmitted by the mobile terminal 200 in the predetermined initial ranging region 405. Further, the radio processing part 102 measures the reception quality of the received initial ranging code.

The radio processing part 102 includes a radio communications part 104. The radio communications part 104 transmits the preamble 401, the frame control header 402, and the DL-MAP 403 of the downlink signal in the downlink subframe 400 using one of the antennas 105a and 105b. Further, the radio communications part 104 transmits the part of the downlink signal other than the preamble 401, the frame control header 402, and the DL-MAP 403, that is, the UL-MAP 404 and the downlink burst, in the downlink subframe 400 using the two antennas 105a and 105b.

Further, while transmitting the downlink signal using the one of the antennas 105a and 105b, the radio communications part 104 awaits the initial ranging code to be transmitted by the mobile terminal 200 in the predetermined initial ranging region 405 and receives the initial ranging code transmitted from the mobile terminal 200 by the initial ranging procedure, using the other one of the antenna 105a and 105b which one is not transmitting the downlink signal. The initial ranging code is represented by a predetermined symbol, for example, two symbols.

Of symbols for transmitting information common to mobile terminals, a region other than the preamble 401 is determined as the initial ranging region 405. For example, a slot after the first two symbols in an allocated transmission band is determined as the initial ranging region 405. In terms of the mobile terminal 200 reading a frame prefix included in the frame control header 402 and transmitting the initial ranging code in accordance with segments after performing synchronization by using the preamble 401, it is preferable to set the initial ranging region 405 in a slot adjacent to the frame control header 402.

The radio processing part 102 includes a reception quality measurement part 106. The reception quality measurement part 106 measures the reception quality of the initial ranging code received by the radio communications part 104. For example, the reception quality measurement part 106 measures the received signal strength indication (RSSI) and the time offset of the initial ranging code received by the radio communications part 104. The reception quality measurement part 106 inputs the measured reception quality to a control part 108 described below.

The base station 100 includes the control part 108. The control part 108 maps the downlink signal in the downlink subframe 400. Further, the control part 108 controls communications based on the reception quality of the ranging code transmitted by the mobile terminal 200.

The control part 108 includes a mapping part 110. The mapping part 110 maps the downlink signal onto subchannels in the downlink subframe 400. For example, as shown in FIG. 4, the preamble 401 is mapped onto the first symbol (K), the frame control header 402 and the DL-MAP 403 are mapped onto the second symbol (K+1), and the downlink burst is mapped onto the third and subsequent symbols (K+3 through K+15) in the downlink subframe 400. This mapping is an example and may be suitably changed.

The control part 108 includes a communications control part 112 as a ranging processing part. The communications control part 112 performs scheduling based on the reception quality of the initial ranging code input by the reception quality measurement part 106.

The base station 100 includes a wire connection part 114. The wire connection part 114 establishes a connection between the base station 100 and its host station. Here, the host station may be either a control station or a core network.

The base station 100 includes a storage part 116. The storage part 116 stores the initial ranging region 405 where the initial ranging code transmitted by the mobile terminal 200 is awaited, that is, the storage part 116 stores information on a radio resource where the initial ranging code is transmitted.

A description is given, with reference to FIG. 6, of the mobile terminal 200 according to this embodiment.

The mobile terminal 200 includes a radio processing part 202 serving as a synchronization part, a radio communications part, and a transmission part. The radio processing part 202 performs synchronization with the preamble 401 included in the downlink subframe 400 transmitted by the base station 100. Further, the radio processing part 202 receives the downlink subframe 400 transmitted by the base station 100. Further, the radio processing part 202 transmits an initial ranging code in the predetermined initial ranging region 405 after synchronization with the preamble 401.

The mobile terminal 200 includes a storage part 206. The storage part 206 stores the initial ranging region 405 where the mobile terminal 200 transmits the initial ranging code, that is, the storage part 206 stores information on a radio resource where the initial ranging code is transmitted.

The mobile terminal 200 includes a control part 204. The control part 204 performs control so that the mobile terminal 200 transmits the initial ranging code using the initial ranging region 405 stored in the storage part 206 after the synchronization with the base station 100 is established. Further, based on the downlink radio frame 400 transmitted by the base station 100, the control part 204 understands the profile information of the downlink burst subsequent to the frame control header 402 by the frame control header 402, understands the schedule, profile and length information of the TDM burst in the downlink subframe 400 by the DL-MAP 403, understands the schedule, profile and length information of the TDM burst in the uplink subframe 500 by the UL-MAP 404, and understands the frame configuration by DCD/UCD.

If a response to the transmitted initial ranging code is not received in the radio processing part 202, the control part 204 retransmits the initial ranging code using the predetermined initial ranging region 405 in the downlink subframe 400 with the same timing. The radio processing part 202 may receive no response to the transmitted initial ranging code because the transmitted initial ranging code has not been received by the base station 100 because of contention caused by simultaneous access to the base station 100 by multiple mobile terminals (200). Further, in the case of receiving no response to the transmitted initial ranging code in the radio processing part 202, each mobile terminal 200 can attempt to perform ranging at a random time based on a backoff parameter defined on UCD if the control part 204 understands the frame configuration by UCD. This makes it possible to reduce the collision of initial ranging codes transmitted from multiple mobile terminals 200, so that it is possible to reduce the likelihood of no transmission of a response to the transmitted initial ranging code from the base station 100.

Further, the control part 204 selects an initial ranging code to be transmitted from multiple ranging codes predetermined for initial ranging codes. For example, a predetermined number of ranging codes of prepared ranging codes are used as initial ranging codes. For example, 256 ranging codes are prepared, and X of them (X ranging codes) are used as initial ranging codes, where X is an integer greater than zero (X>0). That is, the $0^{th}$ to $X^{th}$ ranging codes are used as initial ranging codes. In this case, the ranging codes other than the $0^{th}$ to $X^{th}$ ranging codes, that is, the $(X+1)^{th}$ to $255^{th}$ ranging codes are used as ranging codes other than the initial ranging codes. The ranging codes other than the initial ranging codes include a periodic ranging code, a bandwidth request code, and a handover ranging code. With respect to these ranging codes, the assignment of ranging codes is also arbitrary.

Next, a description is given of operations of the communications system according to this embodiment.

In this embodiment, a description is given separately of the case where the mobile terminal 200 has failed to receive DCD/UCD and is not informed of the frame configuration and of the case where the mobile terminal 200 has received DCD/UCD and is informed of the frame configuration, when no response to the transmitted initial ranging code is received.

Figure 7:
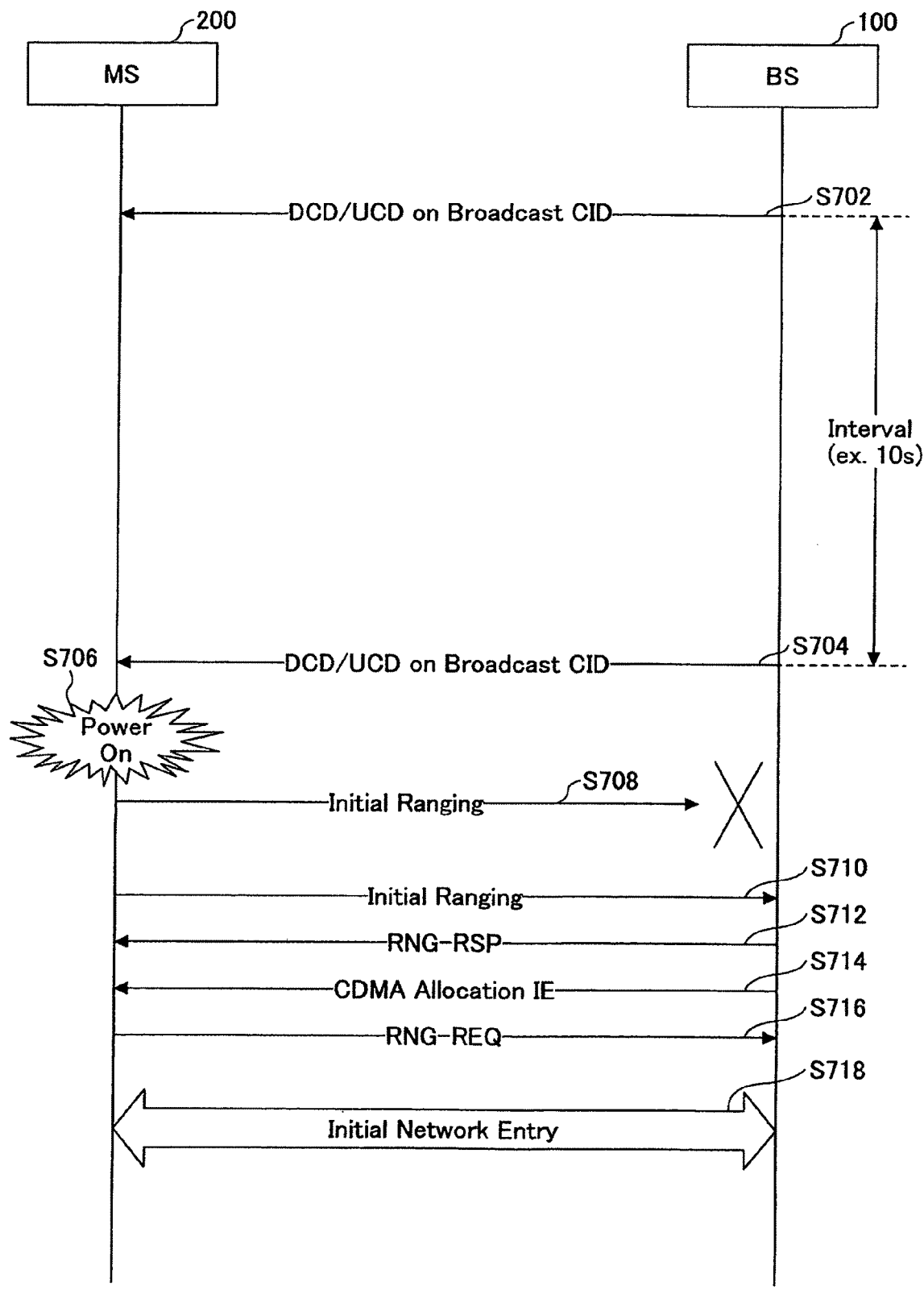
FIG. 7 is a flowchart showing an initial network entry procedure in a communications system according to the first embodiment of the present invention.

A description is given, with reference to FIG. 7, of the case where the mobile terminal 200 has failed to receive DCD/UCD and is not informed of the frame configuration.

The base station 100 transmits a downlink signal in the downlink subframe 400 (FIG. 4). For example, the base station 100 puts DCD/UCD on a broadcast channel at any transmission intervals, and transmits DCD/UCD to each of its subordinate mobile terminals 200, that is, each mobile terminal 200 in the area covered by the base station 100 (steps S702 and S704). For example, the DL-MAP 403 specifies the fields of downlink bursts. Further, one of the downlink bursts is specified as a field for carrying a broadcast CID (connection ID). The UL-MAP 404 is carried on this specified downlink burst. The mapping part 110 maps the downlink signal onto the downlink subframe 400. The mapped downlink signal is transmitted by the radio communications part 104. Here, of the information included in the downlink signal, the preamble 401, the frame control header 402, and the DL-MAP 403 are transmitted through one of the two antennas 105a and 105b, and the other information is transmitted through the two antennas 105a and 105b.

The mobile terminal 200 is turned ON (step S706). The mobile terminal 200 performs synchronization by using the preamble 401 included in the downlink subframe 400 transmitted by the base station 100. The mobile terminal 200 can read information inside the frame by synchronizing with the preamble 401 transmitted by the base station 100. Then, the mobile terminal 200 reads a frame prefix included in the frame control header 402, and transmits an initial ranging code using the predetermined initial ranging region 405 in accordance with segment information (step S708).

The mobile terminal 200 recognizes the initial ranging region 405. For example, the mobile terminal 200 recognizes that the initial ranging region 405 is a symbol immediately after the frame control header 402, that is, the initial ranging region 405 is in the same slot as the frame control header 402 and adjacent to the frame control header 402.

Specifically, the radio processing part 202 performs synchronization by using the preamble 401 included in the downlink subframe 400 transmitted by the base station 100. The control part 204 reads the frame prefix included in the frame control header 402, and performs control so that the initial ranging code is transmitted using the predetermined initial ranging region 405 in accordance with segment information. For example, the control part 204 selects the initial ranging code from preassigned ranging codes. This makes it possible to proceed with the initial ranging procedure without depending on the transmission timing of UCD.

Here, for example, if the initial ranging code transmitted from the mobile terminal 200 is not received by the base station 100 because of contention caused by multiple mobile terminals simultaneously accessing the base station 100, a response to the transmitted initial ranging code is not transmitted from the base station 100. In such a case, the mobile terminal 200 retransmits the initial ranging code with the same timing, that is, using the predetermined initial ranging region 405 in the downlink subframe 400 of another frame (step S710). For example, the mobile terminal 200 may retransmit the initial ranging code in a frame subsequent to the frame in which the initial ranging code has been transmitted, for example, the frame immediately after the frame in which the initial ranging code has been transmitted.

A response to the transmitted initial ranging code is transmitted from the base station 100 (step S712). For example, the radio communications part 104 transmits a ranging response (RNG-RSP) to the received initial ranging code to the mobile terminal 200 that has transmitted the initial ranging code.

The base station 100 transmits a CDMA allocation IE to the mobile terminal 200 (step S714).

In response to reception of the ranging response and the CDMA allocation IE, the mobile terminal 200 transmits a ranging request (RNG-REQ) to the base station 100 (step S716).

Initial network entry is performed between the base station 100 and the mobile terminal 200 (step S718).

Figure 8:
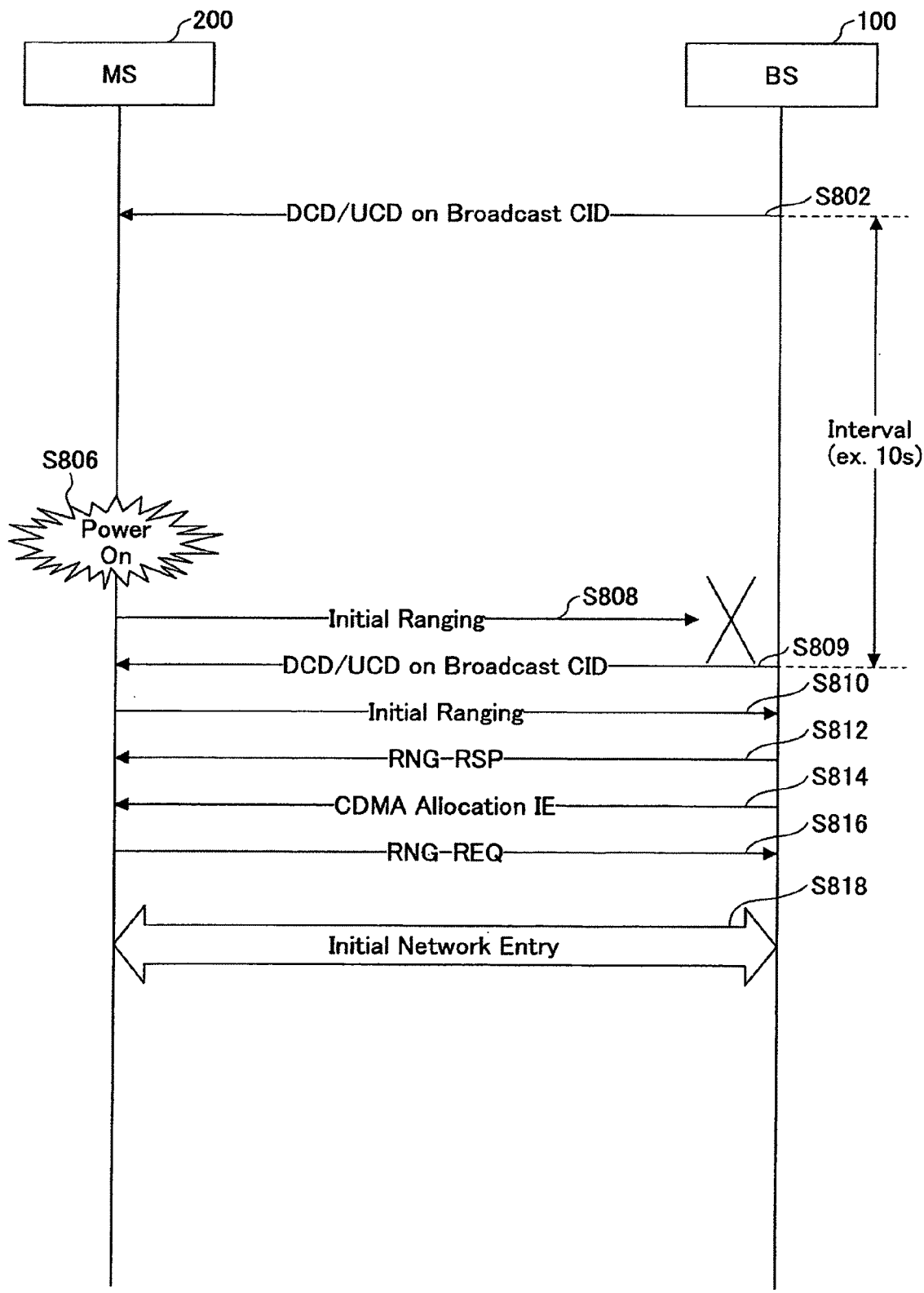
FIG. 8 is a flowchart showing an initial network entry procedure in the communications system according to the first embodiment of the present invention.

Next, a description is given, with reference to FIG. 8, of the case where the mobile terminal 200 has received DCD/UCD and is informed of the frame configuration.

The base station 100 transmits a downlink signal in the downlink subframe 400 (FIG. 4). For example, the base station 100 puts DCD/UCD on a broadcast channel at any transmission intervals, and transmits DCD/UCD to each of its subordinate mobile terminals 200, that is, each mobile terminal 200 in the area covered by the base station 100 (steps S802). For example, the DL-MAP 403 specifies the fields of downlink bursts. Further, one of the downlink bursts is specified as a field for carrying a broadcast CID. The UL-MAP 404 is carried on this specified downlink burst. The mapping part 110 maps the downlink signal onto the downlink subframe 400. The mapped downlink signal is transmitted by the radio communications part 104. Here, the preamble 401, the frame control header 402, and the DL-MAP 403 are transmitted through one of the two antennas 105a and 105b, and the other information is transmitted through the two antennas 105a and 105b.

The mobile terminal 200 is turned ON (step S806). The mobile terminal 200 performs synchronization by using the preamble 401 included in the downlink subframe 400 transmitted by the base station 100. Then, the mobile terminal 200 reads a frame prefix included in the frame control header 402, and transmits an initial ranging code using the predetermined initial ranging region 405 in accordance with segment information (step S808).

Specifically, the radio processing part 202 performs synchronization by using the preamble 401 included in the downlink subframe 400 transmitted by the base station 100. The control part 204 reads the frame prefix included in the frame control header 402, and performs control so that the initial ranging code is transmitted using the predetermined initial ranging region 405 in accordance with segment information. This makes it possible to proceed with the initial ranging procedure without depending on the transmission timing of UCD.

Here, for example, if the initial ranging code transmitted from the mobile terminal 200 is not received by the base station 100 because of contention caused by multiple mobile terminals simultaneously accessing the base station 100, a response to the transmitted initial ranging code is not transmitted from the base station 100.

The mobile terminal recognizes that no ranging response has been received from the base station 100 since transmission of the initial ranging code. After passage of a predetermined period of time, the mobile terminal 200 retransmits the initial ranging code. Before the mobile terminal 200 retransmits the initial ranging code, the base station 100 transmits a downlink signal because a time for its transmission comes (step S809). The mapping part 110 maps the downlink signal onto the downlink subframe 400. The mapped downlink signal is transmitted by the radio transmission part 104. Here, of the information included in the downlink signal, the preamble 401, the frame control header 402, and the DL-MAP 403 are transmitted through one of the two antennas 105a and 105b, and the other information is transmitted through the two antennas 105a and 105b.

The mobile terminal 200 receives the downlink subframe 400 transmitted by the base station 100, and understands the frame configuration by DCD/UCD.

The mobile terminal 200 transmits (retransmits) the initial ranging code at a random time using the ranging region 501 defined by the UL-MAP 404 based on a backoff parameter defined by UCD (step S810). Specifically, the control part 204 understands the backoff parameter defined by UCD, and performs control so as to transmit the initial ranging code at a random time using the ranging region 501 defined by the UL-MAP 404. Here, the ranging region 501 defined by the UL-MAP 404 may be over multiple slots. In this case, any slot may be selected from the multiple slots, and the initial ranging code is transmitted using the selected slot (ranging region).

A response to the transmitted initial ranging code is transmitted from the base station 100 (step S812). For example, the radio communications part 104 transmits a ranging response (RNG-RSP) to the received initial ranging code to the mobile terminal 200 that has transmitted the initial ranging code.

The base station 100 transmits a CDMA allocation IE to the mobile terminal 200 (step S814).

In response to reception of the ranging response and the CDMA allocation IE, the mobile terminal 200 transmits a ranging request (RNG-REQ) to the base station 100 (step S816).

Initial network entry is performed between the base station 100 and the mobile terminal 200 (step S818).

In the operations of the communications system described with reference to FIG. 7 and FIG. 8, the collision (contention) of initial ranging codes transmitted by multiple mobile terminals can be reduced more in the case of understanding the configuration of the entire frame based on DCD/UCD and transmitting the initial ranging code at a random time based on the backoff parameter, if initial network entry can be completed at the end.

According to this embodiment, the mobile terminal 200 can transmit an initial ranging code using the statically predetermined initial ranging region 405 without understanding the frame configuration based on DCD/UCD. Therefore, it is possible to improve the processing time performance of initial registration in the initial network entry of the mobile terminal 200.

Second Embodiment

Next, a description is given of a communications system according to a second embodiment of the present invention.

The communications system of this embodiment has the same configuration as the communications system of the first embodiment.

The base station 100 includes multiple antennas, for example, two antennas 105a and 105b as shown in FIG. 5. The mobile terminal 200 includes multiple antennas, for example, two antennas 205a and 205b as shown in FIG. 6. The base station 100 and the mobile terminal 200 perform communications based on MIMO. In this embodiment, a description is given of the case where each of the base station 100 and the mobile terminal 200 has two antennas by way of example. However, the present invention is also applicable to the case where each of the base station 100 and the mobile terminal 200 has three or more antennas. Further, the number of antennas of the base station 100 and the number of antennas of the mobile terminal 200 may be different.

Figure 9:
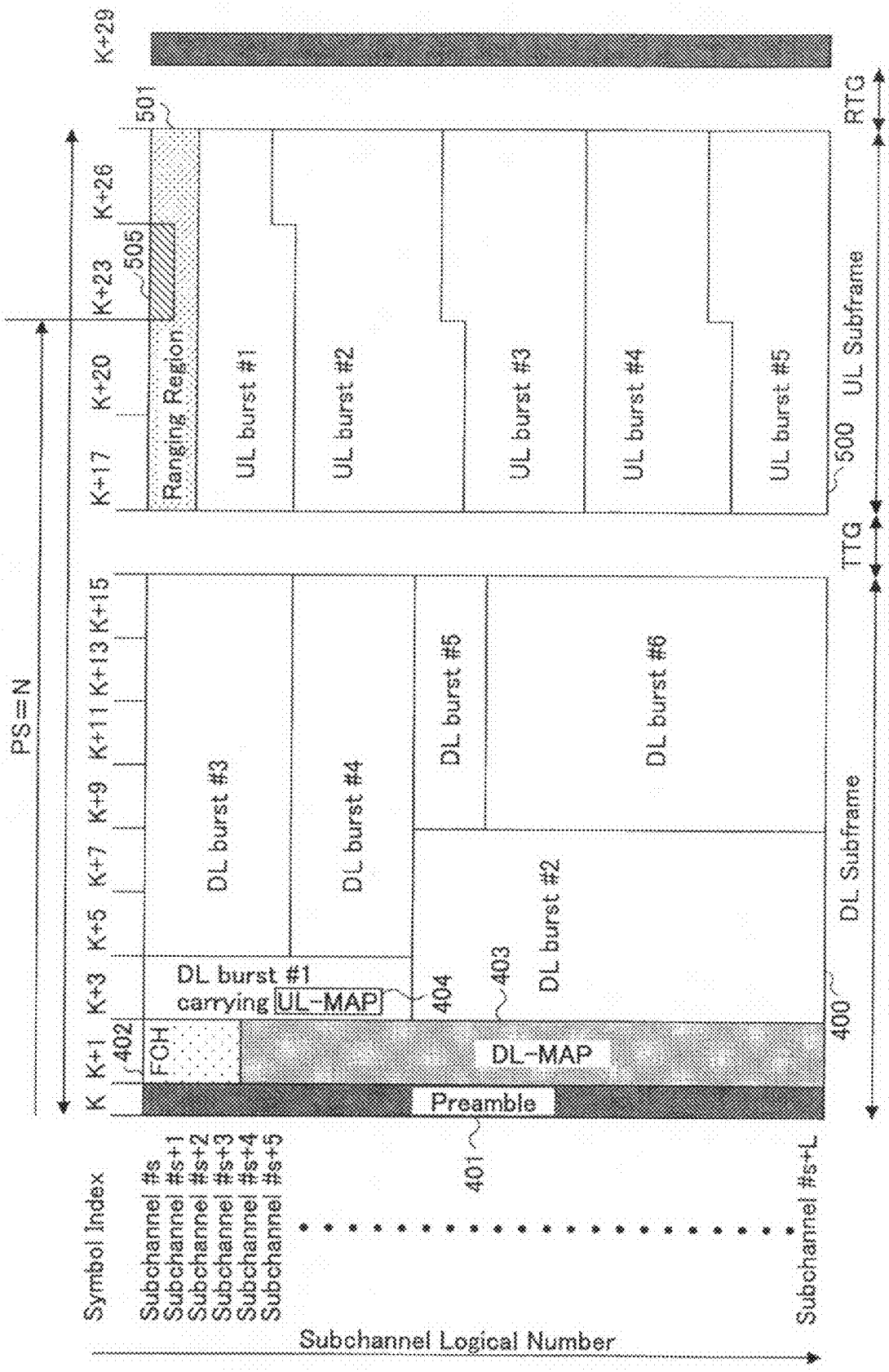
FIG. 9 is an illustrative diagram showing a frame format according to a second embodiment of the present invention.

FIG. 9 is a diagram for illustrating a frame format according to the second embodiment of the present invention. In FIG. 9, the same elements as those of FIG. 4 are referred to by the same reference numerals.

In the communications system according to this embodiment, the mobile terminal 200 transmits an initial ranging code using an initial ranging region 505 (FIG. 9) preallocated in the uplink subframe 500. Further, in the communications system according to this embodiment, the initial ranging region 505 is predetermined in the uplink subframe 500 as a radio resource for transmitting the initial ranging code. For example, the initial ranging region 505 may be determined in the uplink subframe 500 on the protocol. The mobile terminal 100 receives the initial ranging code transmitted by the mobile terminal 200.

This configuration enables the mobile terminal 200 that has been turned ON to perform initial ranging without reading DCD/UCD. Further, even if the mobile terminal 200 that has been turned ON fails to read DCD/UCD, the mobile terminal 200 can perform initial ranging. Accordingly, it is possible to reduce the time after the turning-ON of the mobile terminal 200 before initial entry.

The base station 100 according to this embodiment has the same configuration as that described with reference to FIG. 5. The radio communications part 104 transmits a downlink signal in the downlink frame 400. Part of the downlink signal may be transmitted using one of the two antennas 105a and 105b. Alternatively, part of the downlink signal may be transmitted using the two antennas 105a and 105b in this embodiment. In this case, the part of the downlink signal that can be transmitted using a single antenna includes the preamble 401, the frame control header 402, and the DL-MAP 403. The radio processing part 102 transmits the remaining part of the downlink signal, that is, the part other than the preamble 401, the frame control header 402, and the DL-MAP 403, using the two antennas 105a and 105b. The remaining part of the downlink signal includes the UL-MAP 404 and the downlink burst (DL burst #1 through DL burst #6). The UL-MAP 404 may be included in the downlink burst as shown in FIG. 9, where the UL-MAP 404 is included in DL burst #1.

Further, the radio communications part 104 receives the initial ranging code transmitted from the mobile terminal 200 by the initial ranging procedure in the uplink frame 500. The radio communications part 104 awaits the initial ranging code transmitted by the mobile terminal in the predetermined initial ranging region 505. Further, the reception quality measurement part 106 measures the reception quality of the received initial ranging code. For example, the reception quality measurement part 106 measures the RSSI and the time offset of the initial ranging code received by the radio communications part 104. The reception quality measurement part 106 inputs the measured reception quality to the control part 108.

A predetermined region of the uplink subframe 500 is determined as the initial ranging region 505. For example, as shown in FIG. 9, the first subchannel in an allocated transmission band is determined as the initial ranging region 505. Further, the initial ranging region 505 may be equal to or part of the ranging region 501 reported by DCD/UCD.

The mapping part 110 maps the downlink signal onto subchannels in the downlink subframe 400. For example, as shown in FIG. 9, the preamble 401 is mapped onto the first symbol (K), the frame control header 402 and the DL-MAP 403 are mapped onto the second symbol (K+1), and the downlink burst is mapped onto the third and subsequent symbols (K+3 through K+15) in the downlink subframe 400. This mapping is an example and may be suitably changed.

The communications control part 112 performs scheduling based on the reception quality of the initial ranging code input by the reception quality measurement part 106.

The storage part 116 stores the initial ranging region 505 where the initial ranging code transmitted by the mobile terminal 200 is awaited, that is, the storage part 116 stores information on a radio resource where the initial ranging code is transmitted.

The mobile terminal 200 according to this embodiment has the same configuration as that described with reference to FIG. 6.

The radio processing part 202 performs synchronization with the preamble 401 included in the downlink subframe 400 transmitted by the base station 100. By this synchronization, the radio processing part 202 recognizes a frequency profile from the transmission timing of the preamble 401. Then, the radio processing part 202 locates the initial ranging region 505 positioned $n^{th}$ in a predetermined subchannel from the total number of physical slots (PSs) corresponding to the recognized profile, and transmits the initial ranging code using the located initial ranging region 505. The total number of physical slots differs depending on the profile of a frequency band used. Further, the radio processing part 202 receives the downlink subframe 400 transmitted by the base station 100. Further, the radio processing part 202 transmits the initial ranging code in the predetermined initial ranging region 505 after completion of the synchronization with the preamble 401.

The storage part 206 stores information for the mobile terminal 200 determining (locating) the initial ranging region 505 for transmitting the initial ranging code. For example, the information for determining the initial ranging region 505 includes information indicating a proportion of the frame for starting the initial ranging region 505 in the frame. According to this embodiment, a slot determined by the frame proportion for starting the initial ranging region 505 is assigned to the uplink subframe 500. That is, the downlink subframe 400 is not defined in the slot determined by the frame proportion for starting the initial ranging region 505 and its subsequent slots.

The control part 204 performs control so that the mobile terminal 200 determines (the position of) the initial ranging region 505 using the information for determining the initial ranging region 505 stored in the storage part 206 after establishing synchronization with the base station 100, and transmits the initial ranging code using the determined initial ranging region 505. Further, based on the downlink radio frame 400 transmitted by the base station 100, the control part 204 understands the profile information of the downlink burst subsequent to the frame control header 402 by the frame control header 402, understands the schedule, profile and length information of the TDM burst in the downlink subframe 400 by the DL-MAP 403, understands the schedule, profile and length information of the TDM burst in the uplink subframe 500 by the UL-MAP 404, and understands the frame configuration by DCD/UCD.

If a response to the transmitted initial ranging code is not received, the control part 204 retransmits the initial ranging code using the initial ranging region 505 determined in the uplink subframe 500 with the same timing. The radio processing part 202 may receive no response to the transmitted initial ranging code because the transmitted initial ranging code has not been received by the base station 100 because of contention caused by simultaneous access to the base station 100 by multiple mobile terminals 200. Further, in the case of receiving no response to the transmitted initial ranging code, the control part 204 may attempt to perform ranging at a random time based on a backoff parameter defined on UCD if the control part 204 understands the frame configuration by UCD. This makes it possible to reduce the collision of initial ranging codes transmitted from multiple mobile terminals 200, so that it is possible to reduce the possibility of no transmission of a response to the transmitted initial ranging code from the base station 100.

Next, a description is given of operations of the communications system according to this embodiment.

In this embodiment, a description is given separately of the case where the mobile terminal 200 has failed to receive DCD/UCD and is not informed of the frame configuration and of the case where the mobile terminal 200 has received DCD/UCD and is informed of the frame configuration, when no response to the transmitted initial ranging code is received.

Figure 10:
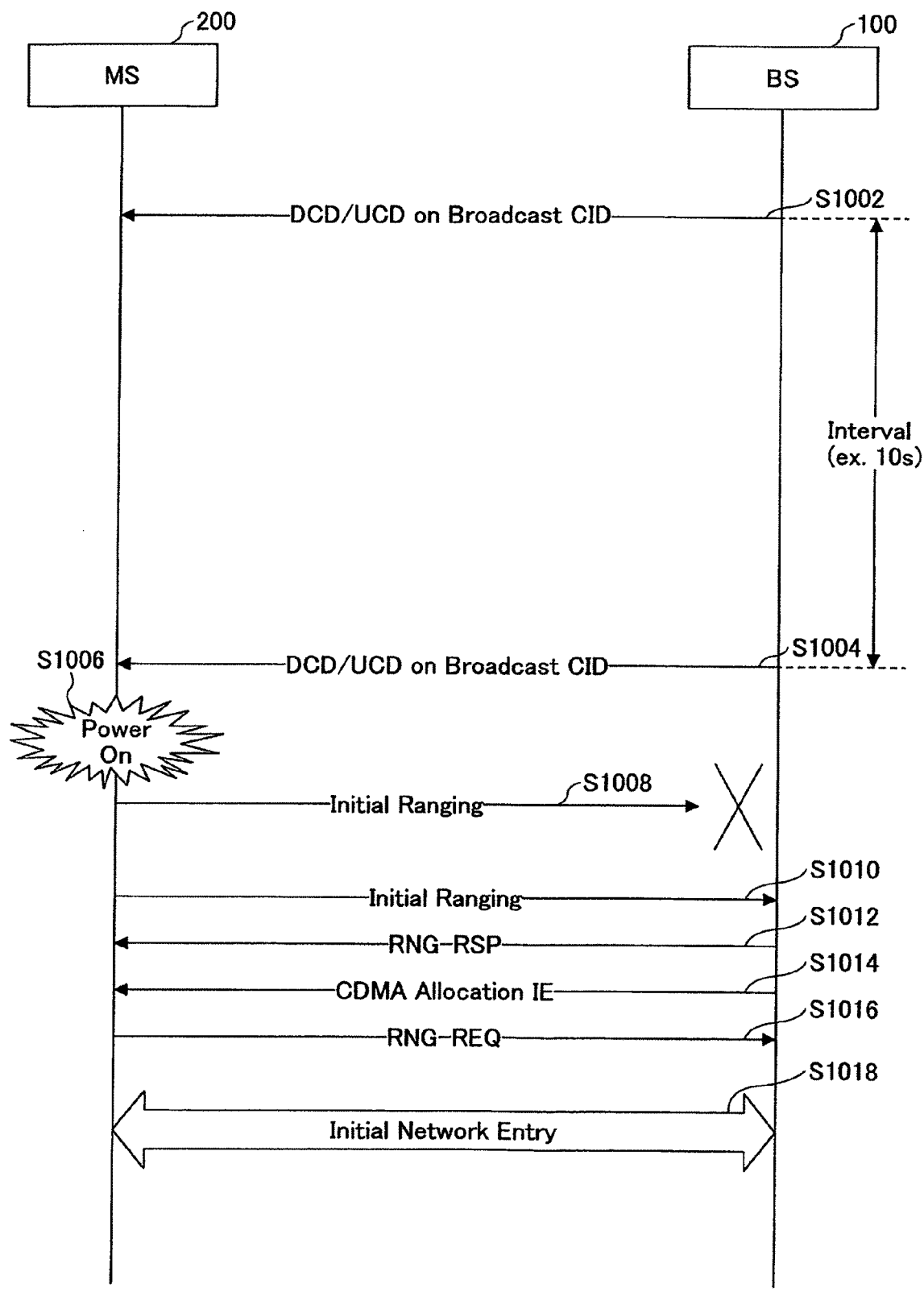
FIG. 10 is a flowchart showing an initial network entry procedure in a communications system according to the second embodiment of the present invention.

A description is given, with reference to FIG. 10, of the case where the mobile terminal 200 has failed to receive DCD/UCD and is not informed of the frame configuration.

The base station 100 transmits a downlink signal in the downlink subframe 400 (FIG. 9). For example, the base station 100 puts DCD/UCD on a broadcast channel at any transmission intervals, and transmits DCD/UCD to each of its subordinate mobile terminals 200, that is, each mobile terminal 200 in the area covered by the base station 100 (steps S1002 and S1004). For example, the DL-MAP 403 specifies the fields of downlink bursts. Further, one of the downlink bursts is specified as a field for carrying a broadcast CID. The UL-MAP 404 is carried on this specified downlink burst. The mapping part 110 maps the downlink signal onto the downlink subframe 400. The mapped downlink signal is transmitted by the radio communications part 104. Here, of the information included in the downlink signal, the preamble 401, the frame control header 402, and the DL-MAP 403 may be transmitted through one of the two antennas 105a and 105b, and the other information is transmitted through the two antennas 105a and 105b.

The mobile terminal 200 is turned ON (step S1006). The mobile terminal 200 performs synchronization by using the preamble 401 included in the downlink subframe 400 transmitted by the base station 100. This synchronization enables the mobile terminal 200 to obtain the frame period and the total number of physical slots in the frame. Then, the mobile terminal 200 determines the number of a physical slot-where the initial ranging region 505 starts based on the obtained total number of physical slots. For example, if 3/4 is prescribed as the information for determining the initial ranging region 505 in the system, the mobile terminal 200 determines (calculates) a physical slot N where the initial ranging region 505 starts by N=n×3/4 using the obtained total number of physical slots n, where N is an integer greater than two (N>2) and n is an integer greater than three (n>3).

Then, the mobile terminal transmits an initial ranging code using the calculated initial ranging region 505 in accordance with the timing of the physical slot N (step S1008). For example, the initial ranging region 505 for transmitting the initial ranging code may be equal to or part of the ranging region 501. By making the initial ranging region 505 part of the ranging region 501, the difference between the presence and absence of recognition of DCD/UCD by the mobile terminal 200 appears as the magnitude of the risk of collision for the initial ranging code. In order to reduce the collision of the initial ranging code, the mobile terminal 200 may transmit the initial ranging code at a random time to avoid the risk of the collision on the temporal axis. Specifically, the radio processing part 202 performs synchronization by using the preamble 401 included in the downlink subframe 400 transmitted by the base station 100, and obtains (recognizes) the frame period and the total number of physical slots in the frame. The control part 204 determines the number of a physical slot where the initial ranging region 505 starts based on the obtained total number of physical slots, and performs control so that the initial ranging code is transmitted using the determined initial ranging region 505 in accordance with the timing of the physical slot.

Here, for example, if the initial ranging code transmitted from the mobile terminal 200 is not received by the base station 100 because of contention caused by multiple mobile terminals simultaneously accessing the base station 100, a response to the transmitted initial ranging code is not transmitted from the base station 100. In such a case, the mobile terminal 200 retransmits the initial ranging code with the same timing, that is, using the determined initial ranging region 505 in the uplink subframe 500 of another frame (step S1010). For example, the mobile terminal 200 may retransmit the initial ranging code in a frame subsequent to the frame in which the initial ranging code has been transmitted, for example, the frame immediately after the frame in which the initial ranging code has been transmitted.

A response to the transmitted initial ranging code is transmitted from the base station 100 (step S1012). For example, the radio communications part 104 transmits a ranging response (RNG-RSP) to the received initial ranging code to the mobile terminal 200 that has transmitted the initial ranging code.

The base station 100 transmits a CDMA allocation IE to the mobile terminal 200 (step S1014).

In response to reception of the ranging response and the CDMA allocation IE, the mobile terminal 200 transmits a ranging request (RNG-REQ) to the base station 100 (step S1016).

Initial network entry is performed between the base station 100 and the mobile terminal 200 (step S1018).

Next, a description is given, with reference to FIG. 11, of the case where the mobile terminal 200 has received DCD/UCD and is informed of the frame configuration.

The base station 100 transmits a downlink signal in the downlink subframe 400 (FIG. 9). For example, the base station 100 puts DCD/UCD on a broadcast channel at any transmission intervals, and transmits DCD/UCD to each of its subordinate mobile terminals 200, that is, each mobile terminal 200 in the area covered by the base station 100 (steps S1102). For example, the DL-MAP 403 specifies the fields of downlink bursts. Further, one of the downlink bursts is specified as a field for carrying a broadcast CID. The UL-MAP 404 is carried on this specified downlink burst. The mapping part 110 maps the downlink signal onto the downlink subframe 400. The mapped downlink signal is transmitted by the radio communications part 104. Here, of the information included in the downlink signal, the preamble 401, the frame control header 402, and the DL-MAP 403 may be transmitted through one of the two antennas 105a and 105b, and the other information may be transmitted through the two antennas 105a and 105b.

The mobile terminal 200 is turned ON (step S1106). The mobile terminal 200 performs synchronization by using the preamble 401 included in the downlink subframe 400 transmitted by the base station 100. This synchronization enables the mobile terminal 200 to obtain the frame period and the total number of physical slots in the frame. Then, the mobile terminal 200 determines the number of a physical slot where the initial ranging region 505 starts based on the obtained total number of physical slots. For example, if 3/4 is prescribed as the information for determining the initial ranging region 505 in the system, the mobile terminal 200 determines (calculates) a physical slot N where the initial ranging region 505 starts by N=n×3/4 using the obtained total number of physical slots n, where N is an integer greater than two (N>2) and n is an integer greater than three (n>3).

Then, the mobile terminal transmits an initial ranging code using the calculated initial ranging region 505 in accordance with the timing of the physical slot N (step S1108). Specifically, the radio processing part 202 performs synchronization by using the preamble 401 included in the downlink subframe 400 transmitted by the base station 100, and understands (obtains) the frame period and the total number of physical slots in the frame. The control part 204 determines the number of a physical slot where the initial ranging region 505 starts based on the obtained total number of physical slots, and performs control so that the initial ranging code is transmitted using the determined initial ranging region 505 in accordance with the timing of the physical slot.

Here, for example, if the initial ranging code transmitted from the mobile terminal 200 is not received by the base station 100 because of contention caused by multiple mobile terminals simultaneously accessing the base station 100, a response to the transmitted initial ranging code is not transmitted from the base station 100.

The mobile terminal recognizes that no ranging response has been received from the base station 100 since transmission of the initial ranging code. After passage of a predetermined period of time, the mobile terminal 200 retransmits the initial ranging code. Before the mobile terminal 200 retransmits the initial ranging code, the base station 100 transmits a downlink signal because a time for its transmission comes (step S1109). The mapping part 110 maps the downlink signal onto the downlink subframe 400. The mapped downlink signal is transmitted by the radio transmission part 104. Here, of the information included in the downlink signal, the preamble 401, the frame control header 402, and the DL-MAP 403 may be transmitted through one of the two antennas 105a and 105b, and the other information is transmitted through the two antennas 105a and 105b.

The mobile terminal 200 receives the downlink subframe 400 transmitted by the base station 100, and understands the frame configuration by DCD/UCD.

The mobile terminal 200 transmits (retransmits) the initial ranging code at a random time using the ranging region 501 (including the initial ranging region 505) defined by the UL-MAP 404 based on a backoff parameter defined by UCD (step S1110). Specifically, the control part 204 understands the backoff parameter defined by UCD, and performs control so as to transmit the initial ranging code at a random time using the ranging region 501 defined by the UL-MAP 404. Here, the ranging region 501 defined by the UL-MAP 404 may be over multiple slots. In this case, any slot may be selected from the multiple slots, and the initial ranging code is transmitted using the selected slot (ranging region).

A response to the transmitted-initial ranging code is transmitted from the base station 100 (step S1112). For example, the radio communications part 104 transmits a ranging response (RNG-RSP) to the received initial ranging code to the mobile terminal 200 that has transmitted the initial ranging code.

The base station 100 transmits a CDMA allocation IE to the mobile terminal 200 (step S1114).

In response to reception of the ranging response and the CDMA allocation IE, the mobile terminal 200 transmits a ranging request (RNG-REQ) to the base station 100 (step S1116).

Initial network entry is performed between the base station 100 and the mobile terminal 200 (step S1118).

According to this embodiment, the base station 100 can perform ranging with the presence or absence of the understanding of DCD/UCD by the mobile terminal 200 being transparent to the base station 100.

Thus, according to one aspect of the present invention, it is possible to reduce the time after the turning-ON (power-ON) of a mobile terminal before the start of ranging.

According to one embodiment of the present invention, there is provided a base station to which Orthogonal Frequency Division Multiplexing/Orthogonal Frequency Division Multiple Access is applied, the base station communicating with a mobile terminal according to Time Division Duplex, wherein a transmission frame in Time Division Duplex includes a downlink subframe and an uplink subframe, the base station including a radio communications part configured to receive an initial ranging code transmitted by the mobile terminal in a ranging region determined by a slot number from the downlink subframe; and a ranging processing part configured to perform ranging based on the initial ranging code received by the radio communications part.

According to one embodiment of the present invention, there is provided a mobile terminal to which Orthogonal Frequency Division Multiplexing/Orthogonal Frequency Division Multiple Access is applied, the mobile terminal communicating with a base station according to Time Division Duplex, wherein a transmission frame in Time Division Duplex includes a downlink subframe and an uplink subframe, the mobile terminal including a synchronization part configured to perform synchronization with the downlink subframe; a ranging region determination part configured to determine a ranging region based on a frame period and a number of physical slots in the frame obtained by the synchronization; and a transmission part configured to transmit an initial ranging code using the ranging region determined by the ranging region determination part.

In the mobile terminal as set forth above, the ranging region determination part may be configured to determine one of the physical slots at which one the ranging region starts based on the frame period and the number of the physical slots in the frame obtained by the synchronization.

In the mobile terminal as set forth above, the transmission part may be configured to retransmit the initial ranging code using the ranging region determined by the ranging region determination part in response to receiving no response to the initial ranging code.

In the mobile terminal as set forth above, the transmission part may be configured to, in a case of being informed of a configuration of the frame based on the downlink subframe, retransmit the initial ranging code using a ranging region determined by the configuration of the frame in response to receiving no response to the initial ranging code.

In the mobile terminal as set forth above, the initial ranging code may be selected from one or more ranging codes predetermined for initial ranging codes.

According to one embodiment of the present invention, there is provided a communications system to which Orthogonal Frequency Division Multiplexing/Orthogonal Frequency Division Multiple Access is applied, the communications system including a base station; and a mobile terminal, wherein the base station and the mobile terminal performs communications according to Time Division Duplex, wherein a transmission frame in Time Division Duplex includes a downlink subframe and an uplink subframe, the base station includes a plurality of first antennas; a radio communications part configured to transmit the downlink subframe through a first one of the first antennas and to receive an initial ranging code transmitted by the mobile terminal through a second one of the first antennas during the transmission of the downlink subframe; and a ranging processing part configured to perform ranging based on the initial ranging code received by the radio communications part, and the mobile terminal includes a plurality of second antennas; and a radio communications part configured to receive the downlink subframe through a first one of the second antennas and to transmit the initial ranging code through a second one of the second antennas during the reception of the downlink subframe.

According to one embodiment of the present invention, there is provided a communications system to which Orthogonal Frequency Division Multiplexing/Orthogonal Frequency Division Multiple Access is applied, the communications system including a base station; and a mobile terminal, wherein the base station and the mobile terminal perform communications according to Time Division Duplex, wherein a transmission frame in Time Division Duplex includes a downlink subframe and an uplink subframe, the base station includes a radio communications part configured to receive an initial ranging code transmitted by the mobile terminal in a ranging region determined by a slot number from the downlink subframe; and a ranging processing part configured to perform ranging based on the initial ranging code received by the radio communications part, and the mobile terminal includes a synchronization part configured to perform synchronization with the downlink subframe; a ranging region determination part configured to determine the ranging region based on a frame period and a number of physical slots in the frame obtained by the synchronization; and a transmission part configured to transmit the initial ranging code using the ranging region determined by the ranging region determination part.

According to one embodiment of the present invention, there is provided a method of performing communications according to Time Division Duplex, to which method Orthogonal Frequency Division Multiplexing/Orthogonal Frequency Division Multiple Access is applied, wherein a transmission frame in Time Division Duplex includes a downlink subframe and an uplink subframe, the method including (a) a base station transmitting the downlink subframe; (b) a mobile terminal synchronizing with the downlink subframe; (c) the mobile terminal determining a ranging region determined by a slot number from the downlink subframe, based on a frame period and a number of physical slots in the frame obtained by step (b); (d) the mobile terminal transmitting an initial ranging code using the ranging region determined by step (c); (e) the base station receiving the initial ranging code transmitted by the mobile terminal in the ranging region determined by the slot number from the downlink subframe; and (f) the base station performing ranging based on the initial ranging code received by step (e).

The present invention is not limited to the specifically disclosed embodiments, and variations and modifications may be made without departing from the scope of the present invention.

The present application is based on Japanese Priority Patent Application No. 2007-326457, filed on Dec. 18, 2007, the entire contents of which are hereby incorporated by reference.

What is claimed is:

1. A base station to which Orthogonal Frequency Division Multiplexing/Orthogonal Frequency Division Multiple Access is applied, the base station communicating with a mobile terminal according to Time Division Duplex, wherein a transmission frame in Time Division Duplex includes a downlink subframe and an uplink subframe, the base station comprising:
a plurality of antennas;
a radio communications part configured to transmit the downlink subframe through a first one of the antennas and to receive an initial ranging code transmitted by the mobile terminal in a preallocated ranging region in the downlink subframe through a second one of the antennas during the transmission of the downlink subframe; and
a ranging processing part configured to perform ranging based on the initial ranging code received by the radio communications part.

2. The base station as claimed in claim 1, wherein the preallocated ranging region is a region other than a preamble in symbols for transmitting information common to the mobile terminal and another mobile terminal.

3. The base station as claimed in claim 2, wherein the preallocated ranging region is adjacent to a frame control header.

4. A mobile terminal to which Orthogonal Frequency Division Multiplexing/Orthogonal Frequency Division Multiple Access is applied, the mobile terminal communicating with a base station according to Time Division Duplex, wherein a transmission frame in Time Division Duplex includes a downlink subframe and an uplink subframe, the mobile terminal comprising:
a plurality of antennas; and
a radio communications part configured to receive the downlink subframe through a first one of the antennas and to transmit an initial ranging code using a preallocated ranging region in the downlink subframe through a second one of the antennas during the reception of the downlink subframe.

5. The mobile terminal as claimed in claim 4, wherein the radio communications part is configured to retransmit the initial ranging code using the preallocated ranging region in response to no reception of a response to the initial ranging code.

6. The mobile terminal as claimed in claim 4, wherein the radio communications part is configured to, in a case of being informed of a configuration of the frame based on the downlink subframe, retransmit the initial ranging code using a ranging region determined by the configuration of the frame in response to receiving no response to the initial ranging code.

7. The mobile terminal as claimed in claim 4, wherein the initial ranging code is selected from one or more ranging codes predetermined for initial ranging codes.

8. A method of performing communications according to Time Division Duplex, to which method Orthogonal Frequency Division Multiplexing/Orthogonal Frequency Division Multiple Access is applied, wherein a transmission frame in Time Division Duplex includes a downlink subframe and an uplink subframe, the method comprising:
a base station transmitting the downlink subframe through a first one of first antennas thereof;
a mobile terminal receiving the downlink subframe through a first one of second antennas thereof;
the mobile terminal transmitting an initial ranging code using a preallocated ranging region in the downlink subframe through a second one of the second antennas thereof;
the base station receiving the initial ranging code transmitted by the mobile terminal in the preallocated ranging region in the downlink subframe through a second one of the first antennas thereof during the transmission of the downlink subframe; and
the base station performing ranging based on the received initial ranging code.

* * * * *